D. P. DAVIES.
TRACTION WHEEL.
APPLICATION FILED OCT. 5, 1915.
1,170,051.
Patented Feb. 1, 1916.
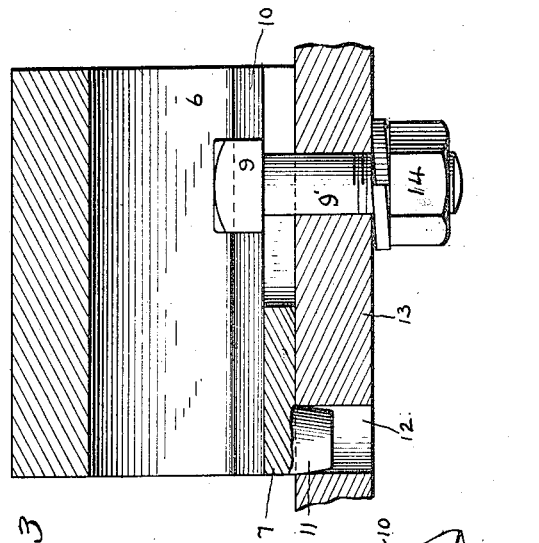
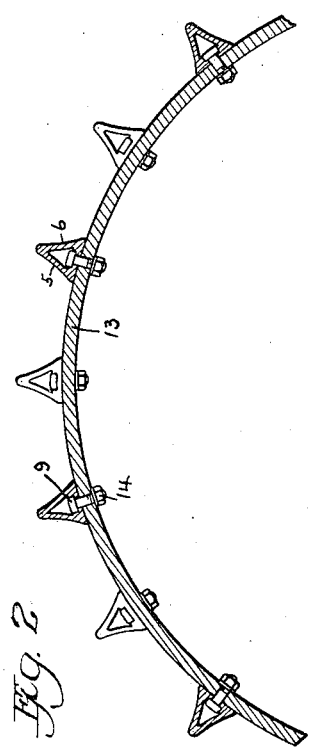
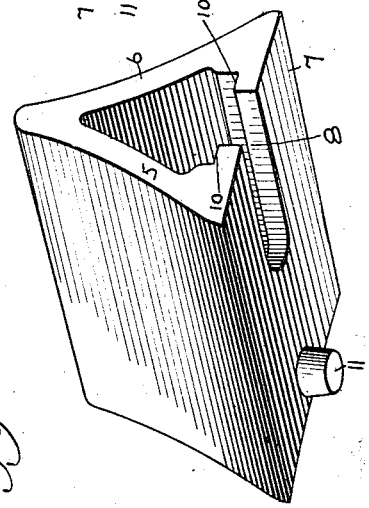
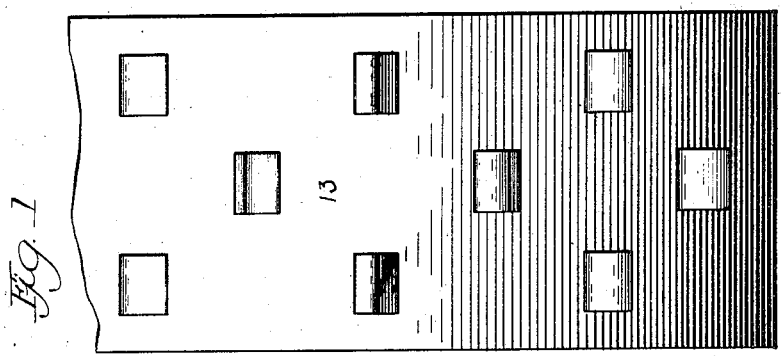
Witnesses:
Inventor:
David P. Davies,
By James A. Walsh,
Atty.

UNITED STATES PATENT OFFICE.

DAVID P. DAVIES, OF RACINE, WISCONSIN, ASSIGNOR TO J. I. CASE THRESHING MACHINE COMPANY, OF RACINE, WISCONSIN, A CORPORATION.

TRACTION-WHEEL.

1,170,051.  Specification of Letters Patent.  Patented Feb. 1, 1916.

Application filed October 5, 1915. Serial No. 54,269.

*To all whom it may concern:*

Be it known that I, DAVID P. DAVIES, a citizen of the United States, residing at Racine, in the county of Racine and State of Wisconsin, have invented certain new and useful Improvements in Traction-Wheels, of which the following is a specification.

My present invention relates to improvements in traction wheels of the character employed in the construction of traction engines. In the use of these engines for plowing, and under conditions where the soil is yielding, the grouters which are commonly applied to the wheels are not at all times effective in preventing them from slipping, so that instead of acting as traction wheels to propel the engine they at times turn idly, and a remedy must be applied to enable them to obtain sufficient grip to travel.

The object of my invention is to provide an improved grouter of simple construction, which will be highly efficient and durable, and which may be readily and securely applied to the tires of engine traction wheels in any desired arrangement.

In the accompanying drawing, forming part hereof, Figure 1 is an elevation of a wheel fragment showing the application of my improved grouters thereto; Fig. 2, a transverse section thereof; Fig. 3, a longitudinal sectional view of my improved grouter, and Fig. 4 a perspective thereof.

My improved grouter is of triangular shape in cross section comprising the inclined walls, 5, 6, and the base, 7, forming a hollow structure. Said base is provided with a slot at 8, extending partially therethrough, and a portion of the inner sides of said inclined wall are formed to constitute a slideway and retainer for the bolt head, 9, the material being formed with the ledges, 10, for the purpose. Preferably integrally formed with said base 7 is a lug, 11, adapted to fit snugly into an opening or seat, 12, in a tire, 13.

In assembling my improved grouter upon a tire, the bolt, 9', is inserted in the tire and the slotted portion of the grouter is slid under the head 9 thereof until the lug 11 becomes seated in the opening 12, designed to receive it. The bolt is then tightened by the nut, 14, and by this fastening and the lug 11 also entering the tire, as indicated, the grouter is immovably secured, so that when striking an obstruction or unyielding substance it will not become twisted out of position. By constructing the grouter in the manner indicated I provide a structure of greater depth than the ordinary grouter, and when arranged in zig zagged or irregular relation on the tire the traction wheel is rendered highly effective in producing a positive gripping effect upon the soil at short intervals, which insures its constant tractive efficiency. Also, by this construction I am enabled to replenish broken grouters at slight cost and labor, as they are capable of removal and attachment in a very simple manner.

I claim as my invention:

1. A grouter for traction wheels including side walls, a base connecting said walls having a longitudinal slot therein, a bolt extending through the slotted portion of said base for securing said grouter to the wheel rim, and a lug on said base adapted to be inserted in the wheel rim to prevent displacement of said grouter.

2. A substantially triangular grouter for traction wheels including a slotted base having a guideway, a bolt extending through said slotted base and held in said guideway from turning, and a lug on said base adapted to be inserted in the wheel rim to prevent said grouter from turning.

In testimony whereof I affix my signature in presence of two witnesses.

DAVID P. DAVIES.

Witnesses:
 FRANK N. BULL,
 J. A. WALSH.